Jan. 9, 1923.
H. F. SHELDON.
PNEUMATIC TIRE.
FILED FEB. 21, 1920.
1,442,007.
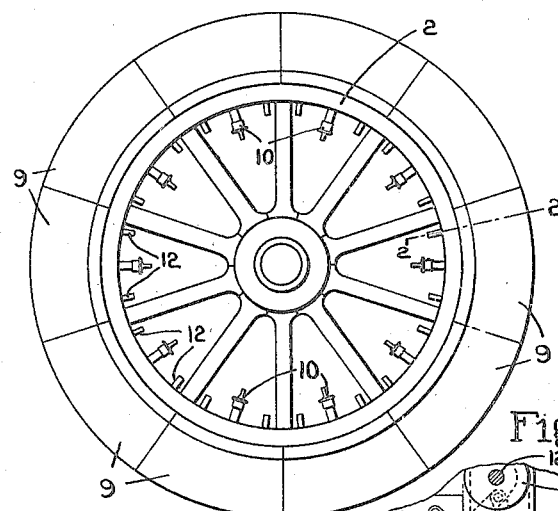
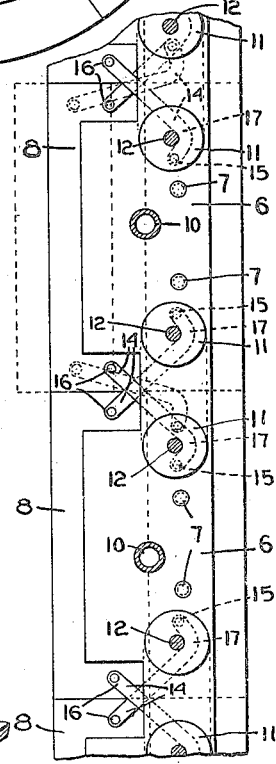
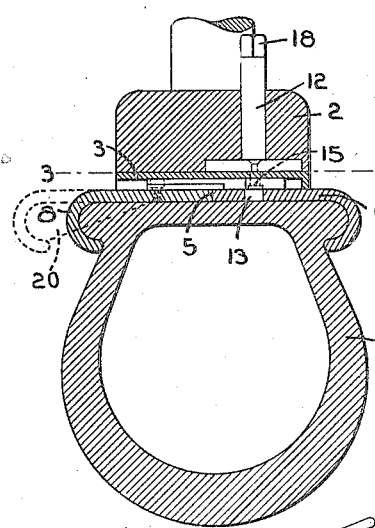
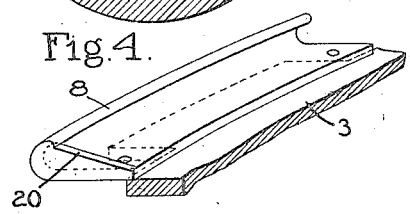
Inventor.
Herbert F. Sheldon
by Heard Smith & Tennant.
Attys Patented Jan. 9, 1923.

1,442,007

UNITED STATES PATENT OFFICE.

HERBERT F. SHELDON, OF BOSTON, MASSACHUSETTS, ASSIGNOR OF ONE-THIRD TO CHARLES M. BURROUGHS, OF BOSTON, MASSACHUSETTS.

PNEUMATIC TIRE.

Application filed February 21, 1920. Serial No. 360,352.

*To all whom it may concern:*

Be it known that I, HERBERT F. SHELDON, a citizen of the United States, residing at Boston, county of Suffolk, State of Massachusetts, have invented an Improvement in Pneumatic Tires, of which the following description, in connection with the accompanying drawing, is a specification, like characters on the drawing representing like parts.

This invention relates to a pneumatic-tired vehicle wheel and especially to that type of vehicle wheel in which the tire is made in independently-removable sections.

The object of the invention is to provide an improved construction by which the individual sections can be quickly and easily removed or replaced.

I attain this object by dividing the rim which receives the tire circumferentially, one side of said rim being continuous and being rigidly secured to the vehicle wheel, and the other side being made in sections which are capable of movement transversely toward and from the fixed continuous portion of the rim.

The tire is made in sections corresponding to the sections of the rim, and means are provided whereby each rim section can be moved transversely away from the fixed section so as to permit the corresponding tire section to be removed or replaced.

In order to give an understanding of my invention, I have illustrated in the drawings a selected embodiment thereof which will now be described, after which the novel features will be pointed out in the appended claims.

In the drawings, Fig. 1 is a side view of a vehicle wheel embodying my invention;

Fig. 2 is an enlarged section on substantially the line 2—2, Fig. 1;

Fig. 3 is a section on the line 3—3, Fig. 2.

Fig. 4 is a fragmentary perspective view showing one section of the rim.

1 indicates a wheel body having the usual wooden felly 2 and also provided with a metal felly band 3. Surrounding the felly band 3 is a tire-receiving rim which receives the pneumatic tire indicated generally at 4. This tire-receiving rim may be either of the clincher type or of the straight side type as desired. I have illustrated herein a rim of the clincher type.

This tire-receiving rim is divided circumferentially along the line 5 to form two portions, one of which is indicated at 6. The rim portion 6 is continuous and extends clear about the wheel. It is preferably rigidly or fixedly secured to the felly band 3 in some suitable way as by means of rivets or bolts 7. The other portion of the rim is divided transversely into separate sections 8 which rest on the felly band 3 and are capable of movement thereon toward and from the fixed rim portion 6. The pneumatic tire 4 is made in sections 9 which correspond to the sections 8 of the rim. These pneumatic tire sections 9 are independent from each other, each one being constructed to form a separate cell or air chamber and each is provided with a valve 10 of ordinary construction through which it may be inflated.

For moving the rim sections 8 toward and from the fixed rim portion 6, I have provided a plurality of crank disks which are journaled in the fixed portion 6 and are connected by links to the rim sections 8. There will preferably be two crank disks for each rim section, one at each end thereof. These crank disks are indicated at 11 and each is fast on a shaft 12 which extends through the felly 3, and the inner end 13 of which is journaled in the fixed rim portion 6. A link 14 is pivotally connected at one end to each crank disk, as shown at 15, and at the other end to one of the rim sections 8, as shown at 16. There are thus two crank disks 11 and their links 14 for each rim section 8, and by turning these two crank disks for any rim section, said rim section will be separated from the fixed rim section, as shown in dotted lines Fig. 3. When any rim section 8 is thus separated from the fixed portion 6, the corresponding tire section can be readily removed.

In order to more securely hold the rim sections 8 in proper position when they are closed against the fixed portion 6, I will preferably arrange the links 14 at the ends of the tire sections 8 so that they cross each other, as shown in Fig. 3, that is, the link 11 which is secured to one end of one section 8 will be connected to a crank disk 11 that is situated opposite the end of the next adjacent section 8. With this arrangement the links have a sort of bracing action which serves to hold the rim sections 8 more securely in their operative position.

The inner end of each link 14 is curved, as shown at 17, and the pivotal point 15 is so positioned that when the crank disks are turned to close the rim sections 8 against the fixed portion 6, the pivotal points 15 will be carried just by the dead center. The links are thus locked in their closed position and any outward strain on the rim sections will only tend to hold the links more securely in their locked position.

The shafts 12 extend inwardly beyond the inner face of the felly 2 and are squared at their ends, as shown at 18, so that a suitable wrench or other implement may be applied thereto for turning the shaft and crank disks.

With my invention, if any tire section becomes punctured or damaged, it can be quickly removed and replaced by a fresh tire section. It will not be necessary, therefore, for a car to carry an extra tire, it being sufficient if the car has three or four extra tire sections along to replace any which may be damaged.

Each rim section 8 is provided at one end with a transverse flange or worm 20, as best seen in Fig. 4. These flanges 20 fit between the tire sections 9 and serve to prevent any tendency for said sections to creep.

I claim:

1. In a vehicle wheel, the combination with a wheel body, of a rim thereon which is divided circumferentially, one side being continuous and fixedly secured to the wheel body and the other being divided transversely into sections, a sectional pneumatic tire on the rim, there being one section for each section of the rim, and operating means including links connecting each rim section with the fixed portion of the rim by which each rim section can be forced positively outwardly independently of the other rim sections thereby to permit its tire section to be removed.

2. In a vehicle wheel, the combination with a wheel body, of a tire-holding rim thereon, said rim being divided circumferentially and having one side continuous and fixedly secured to the wheel body and the other side divided transversely into sections, crank disks rotatably carried by the fixed portion of the rim, and links connecting said crank disks to the rim sections whereby turning movement of the crank disks will move the rim sections laterally from and towards the fixed rim portion, and a sectional pneumatic tire on the rim.

3. In a vehicle wheel, the combination with a wheel body, of a rim thereon which is divided circumferentially, one side of said rim being continuous and fixedly secured to the wheel body and the other being divided transversely into sections, two links pivotally connected to each rim section, crank disks carried by the fixed portion of the rim and to which said links are connected, and a sectional pneumatic tire on the rim.

4. In a vehicle wheel, the combination with a wheel body, of a rim thereon which is divided circumferentially, one side of said rim being continuous and fixedly secured to the wheel body and the other being divided transversely into sections, a link pivoted to each end of each rim section, a crank disk to which each link is pivoted, said disks being carried by the fixed portion of the rim, and a pneumatic tire on the rim, the links at the ends of the rim sections crossing each other.

5. In a vehicle wheel, the combination with a wheel body, of a rim thereon which is divided circumferentially, one side being continuous and fixedly secured to the wheel body and the other side being divided transversely into sections, a sectional pneumatic tire on the rim, there being one tire section for each section of the rim, links connecting each rim section to the fixed portion of the rim, and means for operating said links thereby to shift the rim sections transversely.

6. In a vehicle wheel, the combination with a wheel body, of a rim thereon which is divided circumferentially, one side being continuous and fixedly secured to the wheel body and the other side being divided transversely into sections, a sectional pneumatic tire on the rim, there being one tire section for each section of the rim, links connecting each rim section to the fixed portion of the rim, and means for operating the links for each rim section independently whereby each rim section can be independently shifted positively transversely of the wheel.

In testimony whereof, I have signed my name to this specification.

HERBERT F. SHELDON.